United States Patent
Terwart et al.

(10) Patent No.: US 10,563,711 B2
(45) Date of Patent: Feb. 18, 2020

(54) CONTROL METHOD FOR A DUAL-CLUTCH TRANSMISSION

(71) Applicant: ZF Friedrichshafen AG, Friedrichshafen (DE)

(72) Inventors: Markus Terwart, Thundorf (DE); Thomas Rauber, Markdorf (DE); Thomas John, Sulzheim (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 310 days.

(21) Appl. No.: 15/667,804

(22) Filed: Aug. 3, 2017

(65) Prior Publication Data

US 2018/0051757 A1  Feb. 22, 2018

(30) Foreign Application Priority Data

Aug. 16, 2016 (DE) ................ 10 2016 215 220

(51) Int. Cl.
*F16D 48/06* (2006.01)

(52) U.S. Cl.
CPC ......... *F16D 48/062* (2013.01); *F16D 48/066* (2013.01); *F16D 2500/1026* (2013.01); *F16D 2500/1045* (2013.01); *F16D 2500/10412* (2013.01); *F16D 2500/308* (2013.01); *F16D 2500/3024* (2013.01); *F16D 2500/30401* (2013.01); *F16D 2500/3166* (2013.01); *F16D 2500/5122* (2013.01); *F16D 2500/525* (2013.01); *F16D 2500/70235* (2013.01)

(58) Field of Classification Search
CPC ............... F16D 48/062; F16D 48/066; F16D 2500/70235; F16D 2500/3166; F16D 2500/1045; F16D 2500/3024; F16D 2500/10412; F16D 2500/525; F16D 2500/30401; F16D 2500/308; F16D 2500/5122; F16D 2500/1026; F16H 2061/0407; F16H 2061/0418; F16H 61/0403; F16H 61/061; F16H 61/684; F16H 61/688

See application file for complete search history.

(56) References Cited

U.S. PATENT DOCUMENTS

| | | | |
|---|---|---|---|
| 2012/0216640 A1* | 8/2012 | Hoffmeister | B60W 10/02 74/335 |
| 2017/0088140 A1* | 3/2017 | Barone | F16H 61/688 |

* cited by examiner

*Primary Examiner* — Jacob S. Scott
*Assistant Examiner* — Lori Wu
(74) *Attorney, Agent, or Firm* — Dority & Manning, P.A.

(57) ABSTRACT

A method for operating a dual-clutch transmission with two clutches. During realization of a ratio, a first clutch is closed and a second clutch is open. During a ratio change, the first clutch is opened and the second clutch is closed. During a ratio change within short operating times, a target actuating pressure of the clutch for engagement is set to a fast-charging pressure level and subsequently adjusted to a closing pressure level, while a target actuating pressure of the clutch for disengagement is adjusted to an opening pressure level before setting the closing pressure level of the clutch for engagement. At least during a ratio change, an actual actuating pressure of the clutch for engagement is monitored and the target actuating pressure of the clutch for disengagement is adjusted to the opening pressure level if the actual actuating pressure of the clutch for engagement exceeds a pressure threshold.

10 Claims, 7 Drawing Sheets

CONTROL METHOD FOR A DUAL-CLUTCH TRANSMISSION

FIELD OF THE INVENTION

The invention generally relates to a method for operating a dual-clutch transmission having a dual-clutch system comprising two clutches.

BACKGROUND

In order to meet the demand for increased driving comfort and performance demanded of a vehicle by sporty drivers through the control of the transmission, exact knowledge of the behavior of the system to be controlled is necessary. This is important in particular for the realization of functions by which demanded operating state changes of automatic transmissions, such as dual-clutch transmissions, are to be performed within short operating times. During the execution of such so-called timing-sensitive functions, an accuracy of the timing of between 10 and 20 milliseconds must be ensured, for which reason deviations between a target system behavior and an actual system behavior must already be correspondingly taken into consideration through pilot control of the system in order to be able to achieve a required reproducibility of the system behavior for a driver of a vehicle equipped with an automatic transmission of said type.

In general, hydraulic controllers of automatic transmissions have, out of their working principle, a "dead time" in the response behavior. As a result the target specifications of a hydraulic system are implemented in the real system only after the expiry of defined operating times. The dead time of the response behavior of a hydraulic system of an automatic transmission varies to a not inconsiderable extent as a function of the operating temperature of the hydraulic fluid of the hydraulic system and also to a certain extent as a function of tolerances of pilot stages and geometrical and mechanical tolerances such as valve geometries, spring characteristic values and the like, and is thus specific to the individual parts. If the scatter owing to manufacturing tolerances is too great, this particularly limits the performance that is reproducibly attainable.

In the case of automatic transmissions known from practice, it is sought, for example, to reproduce the dead time behavior of clutch actuation paths with respect to the temperature of electronic transmission controllers with models, and to correspondingly readjust the scattering component with the aid of an observer function if necessary.

This purely reactive approach by the observer function is disadvantageous because it is able to take into consideration deviations of the system behavior resulting from a corresponding adaptation of the actuation during operation of a hydraulic system only during the execution of robust functions, because there is enough time available during the execution of such robust functions. To be able to ensure acceptable reproducibility even during the execution of performance-emphasized functions, the exact knowledge of the actuation timing of the individual transmission components is already necessary in advance. Then, the respective sequences or target specifications of the individual components can be exactly coordinated with one another, and both demanded driving comfort and corresponding performance is achievable.

Furthermore, the response behavior or a dead time of a hydraulic system of an automatic transmission also varies in a manner dependent on the extent to which air accumulations are present in the hydraulic actuation paths. Such air accumulations exist in clutch actuation paths particularly after relatively long interruptions in operation, during which the hydraulic supply to hydraulic systems of automatic transmissions is substantially equal to zero. During the operation of automatic transmissions, their hydraulic systems are normally deaerated as required toward an oil sump by means of constant leakage volume flows.

At present, the response behavior of the actuation path of clutches of automatic transmissions is taken into consideration by corresponding adaptive algorithms in the electronic transmission controller. Further parameters, such as characteristic curve deviations, scatter relating to the torque transfer capacity of clutches and stiffness transitions of the clutches are determined adaptively during operation. Residual inaccuracies that arise in a manner dependent on the operating state are compensated during the operation of an automatic transmission by corresponding controllers.

In order to be able to meet comfort demands and correct erroneous actuations despite the scatter of the operating behavior of the clutches, the system is given a relatively large amount of time. The times available for the regulation however cannot be reduced to any desired extent, and furthermore, the operating time required for the correcting action is not always available. Therefore, during operating state profiles or during specific driving profiles, for example during a sport mode or during a racetrack operating mode or the like during which the driver comfort demand is not a priority and the driver rather desires high performance, controlled sequences are provided for the operation of an automatic transmission. Through the sequences, demanded operating state changes such as, for example, performance shifts, are implemented within shorter operating times than operating state changes executed in regulated fashion.

The two clutches of a dual-clutch system of a dual-clutch transmission are actuated in the manner described in more detail below during a performance-emphasized ratio change in the dual-clutch transmission such that the clutch assigned to the transmission part in which the presently selected ratio is engaged is opened, whereas the further clutch assigned to the further transmission part in which the target ratio has been engaged in preparatory fashion is transferred in parallel thereto into the closed operating state. For this purpose, the clutch for engagement is transferred within short operating times toward its closed operating state by a fast-charging pulse while the further clutch of the dual-clutch system is in the closed operating state, wherein the actuating pressure of the clutch for engagement is at the end of a fast-charging phase reduced to a defined pressure level at which the clutch for engagement exhibits its desired torque transfer capability.

At the time point of the demand for the ratio change, a time period is determined in a manner dependent on the present operating state of the dual-clutch transmission, after the expiry of which time period the actual actuating pressure of the clutch for engagement will exceed a defined pressure threshold in a manner dependent on the specification of the target actuating pressure of the clutch for engagement, and the target actuating pressure of the clutch for disengagement is abruptly reduced to the opening pressure level in order to transfer the clutch for disengagement into its open operating state to an extent coordinated by the actuation of the clutch for engagement.

Furthermore, the target actuating pressure of the clutch for disengagement is reduced at a time point from the pressure level of the fast-charging phase or from the fast-charging pressure level in a defined manner to the closing pressure level, when the clutch for engagement fully transmits the acting torque. The demanded performance shift is then executed as desired if the clutch for disengagement then substantially no longer transmits any torque at said time point.

By the system parameters likewise adapted as described above, it is possible to calculate a suitably exact and relatively short lengthening of the fast-charging pulse and to thus increase the actual pressure of the clutch for engagement directly with maximum system performance to virtually any target transmission level by a targeted overcharging of the piston chamber of the clutch for engagement, wherein the maximum system performance is limited by the hydraulic delay time or by the dead time of the hydraulic system.

To be able to execute a performance shift with high shift quality within a short operating time, the clutch for disengagement must, as required, be adjusted toward its fully open operating state at the correct time point as abruptly as possible and before the time of taking-on of load by the clutch for disengagement.

Since a blending phase of the overlapping shift without an interruption of tractive force between the two clutches is not defined by targeted control and regulation, as in the case of conventional and more comfort-emphasized shifts, but rather is defined only by the hydraulic delay time of the hydraulic system, the timing relating to the actuation of the two clutches must be defined very accurately in order to ensure or set the correct torque balance during the blending phase.

If the actuation timing of the clutches is not realized owing to corresponding inaccuracies in the system behavior in certain operating ranges of the dual-clutch transmission or is disrupted as a result of states such as air inclusions in the actuation path of the clutches of the hydraulic system, then the performance shift to be executed is likewise impaired owing to a disrupted torque balance during the blending phase of the two clutches of the dual-clutch system, which gives rise to discontinuities in the profile of an output torque, which impair driving comfort.

If the actuating pressures of the clutch for engagement and of the clutch for disengagement cross too early, a transmission deficit occurs during a performance shift, and thus an undesired load-release shock occurs during a traction upshift. In contrast to this, the two transmission halves of a dual-clutch transmission are braced relative to one another if the actuating pressures of the two clutches of the dual-clutch system cross too late.

The accuracy for the timing required for the execution of a performance shift lies in the range from approximately 10 to 20 milliseconds owing to the high performance demands as discussed above. In order to be able to realize such an exact actuation of the clutches, highly accurate knowledge of the system parameters under the present operating conditions, such as the system pressure, the pump volumetric flow, the operating temperature, the drive rotational speed and the like, is required.

The abovementioned adaptation algorithms are however directed out of principle to the determination of the reproducible component specific to the individual parts under steady-state conditions. If a corresponding component is not detected by the adaptation algorithm or if a sporadically occurring scatter is too great, for example owing to air inclusions in the clutch actuation path or the variance of the operating conditions, the performance that is reproducibly attainable with acceptable comfort is limited.

This situation is countered in practice through the fact that sensitive transmission functions such as the performance shift are permitted only in limited operating ranges and only during extremely sporty driving programs activated by the driver, because a driver then tends to accept impairments in comfort.

Present efforts to reduce the energy consumption of motor vehicles are supported inter alia through efficiency improvements of automatic transmissions. For this purpose, it is attempted inter alia to reduce leakage volume flows of hydraulic systems to a minimum, which however impairs a continuous deaeration of the hydraulic system by the leakage volume flows and has the effect that the hydraulic systems are often not sufficiently deaerated, and as a result the respective desired functional behavior is not ensured. Such a sufficiently deaerated or ensured operating state of the hydraulic system of an automatic transmission often cannot be determined as required over wide operating ranges of an automatic transmission or of a vehicle power train equipped therewith, as a result of which timing-sensitive and performance-emphasized functions are prevented in the absence of knowledge of such an operating state of the hydraulic system in order to avoid undefined operating states of an automatic transmission.

It is duly possible for functional impairments during the operation of an automatic transmission which result from air inclusions in the hydraulic system to be compensated by corresponding countermeasures if sufficient control and regulating times are available. This is however not suitable for timing-sensitive and performance-emphasized processes for which such countermeasures must be implemented with the correct timing, because such an observer or regulator provides its feedback too late and is therefore not usable. Here, it is particularly critical that, owing to a multiplicity of intercoordinated processes, timing-sensitive actuation sequences can no longer be stopped or terminated after having been started in order to avoid reactions in the vehicle power train which impair driving comfort, if necessary.

Regardless of possible air inclusions in hydraulic systems of automatic transmissions, the response behavior of automatic transmissions varies in each case in a manner dependent on the respectively present operating point and on component-specific tolerances and in a manner dependent on manufacturing tolerances, for which reason each automatic transmission or each hydraulic system has, even in the fully deaerated operating state, a reproducible component of a dead time or of the response behavior which is specific to each individual example.

Since automatic transmissions are operated with an applicatively determined and averaged dead time value, in the case of automatic transmissions whose reproducible dead time specific to each individual example is greater than the average applicative dead time, timing-sensitive and performance-emphasized functions are prevented despite a hydraulic system of an automatic transmission being in a fully deaerated operating state. Furthermore, in the case of transmissions whose reproducible dead time specific to each individual example lies below the averaged applicative dead time, even in the non-fully-deaerated operating state of its hydraulic system, a reliable response behavior is determined and timing-sensitive and performance-emphasized functions are started and executed despite air inclusions in the system, whereby driving comfort is, however, impaired in an undesired manner.

SUMMARY OF THE INVENTION

The object of the present invention is to provide a method for operating a dual-clutch transmission having a dual-clutch system comprising two clutches by which timing-sensitive and performance-emphasized operating state changes of the dual-clutch transmission is executable as desired.

Accordingly, in the method for operating a dual-clutch transmission having a dual-clutch system comprising two clutches, in each case, one of the clutches is in a closed state during the realization of a ratio and the other one of the clutches is in an open state. The clutch in a closed state is opened and the clutch in an open state is closed during a ratio change. A target actuating pressure of the clutch for engagement is first set to a fast-charging pressure level during a ratio change to be performed within short operating times and is subsequently adjusted to a closing pressure level, while a target actuating pressure of the clutch for disengagement is adjusted to an opening pressure level before the setting of the closing pressure level of the target actuating pressure of the clutch for engagement.

According to the invention, at least during a ratio change, an actual actuating pressure of the clutch for engagement is monitored in the dual-clutch transmission and the target actuating pressure of the clutch for disengagement is adjusted to the opening pressure level if the actual actuating pressure of the clutch for engagement exceeds a pressure threshold.

Since it is the case that during an activated performance shift, in spite of all preventative measures taken, the timing does not take effect in such a way as to realize perfect performance, and effects that are unacceptable to a driver can arise during such adverse operating state profiles despite everything, the actual actuating pressure of the clutch for engagement is monitored during the execution of the approach according to the invention during a performance shift, and is adapted, in a manner dependent on the monitoring the timing of the performance shift, if necessary during the execution thereof within correspondingly short operating times such that the performance shift is performable in each case with acceptable driving comfort or shift comfort.

By the approach according to the invention, performance shifts can generally be implemented over a greater operating range of a dual-clutch transmission with simultaneously acceptable driving comfort. This is advantageous because, owing to the high shift speed of performance shifts and the short operating time window, it is additionally also achieved that other disturbances or changes in the system environment that can arise during a performance shift that is actively taking place, for example a load reversal, are so unlikely, or that the effects thereof on the shift sequence are so slight, that they are no longer of significance with regard to effect on driver impression.

Thus, performance shifts and further time-sensitive functions is performable over a wide operating range of a vehicle power train with acceptable driving comfort throughout, for example even in a lower sport-oriented range where shifts are demanded by a driver only using a manual shifting gate. Aside from the aspect of the smooth transition of sporty and at the same time comfortable operation, it is now also ensured to a greater extent that, owing to shifts which are performed adequately quickly, hybrid applications with electric machines do not have to unduly interrupt the recuperation process during stoppage processes.

If a time period after the expiry of which the actual actuating pressure of the clutch for engagement reaches the pressure threshold is determined theoretically, by a model which represents the dual-clutch system, in a manner dependent on the operating state of the dual-clutch transmission which the dual-clutch transmission is in before the target actuating pressure of the clutch for engagement is set to the fast-charging pressure level, the actuation of the clutches of the dual-clutch system can, in a manner dependent on the operating state of the dual-clutch transmission present at the time point of the demand for the ratio change to be performed, be defined and adapted with little effort in terms of control and regulation to the actual sequence of the ratio change for the entire future ratio change.

In an easily implementable variant of the method according to the invention, the clutch for disengagement is opened before the expiry of the determined time period if the actual actuating pressure of the clutch for engagement reaches the pressure threshold already before the expiry of the determined time period.

If the actual actuating pressure of the clutch for engagement reaches the pressure threshold only after the expiry of the determined time period, the clutch for disengagement is opened only after the expiry of the determined time period. By the delayed opening of the clutch for disengagement, it is achieved with little effort that the clutch for disengagement is not transferred into its open operating state too early and the start of the blending phase of the two clutches is delayed until the clutch for engagement is substantially prepared for taking on load from the clutch for disengagement.

A further theoretically determined time period after the expiry of which the target actuating pressure of the clutch for engagement is adjusted from the fast-charging pressure level toward the closing pressure level is lengthened by a time period, which is variable in a manner dependent on the operating state, if the actual actuating pressure of the clutch for engagement reaches the pressure threshold only after the expiry of the further determined time period. By the lengthening of the fast-charging pulse of the clutch for engagement, the start of the blending phase of the two clutches is delayed until the clutch for engagement is substantially prepared for taking on load from the clutch for disengagement.

In an advantageous variant of the method according to the invention, the fast-charging pressure level of the target actuating pressure of the clutch for engagement is at least temporarily varied such that a torque acting at the transmission output side during the ratio change corresponds at least approximately to the torque acting before the execution of the demanded ratio change.

In this way, it is in turn achieved with little actuating effort that the shift sequence of the performance shift is not unduly influenced by the characteristics of the vehicle power train. Here, for the level of the torque transfer capacity to be set in the clutch for engagement or for the torque level of said clutch, a value may be selected in each case, taking into consideration the transmission ratio step of the shift, by which value the acceleration level during the blending phase of the two clutches can be kept at the level of the actual ratio engaged in the dual-clutch transmission. In this way, the vehicle power train is loaded virtually uniformly during the blending phase of the performance shift and disturbances or undesired fluctuations in the profile of the torque acting through an output are avoided in a simple manner.

If the target actuating pressure of the clutch for engagement is varied in regulated fashion from the fast-charging pressure level toward the closing pressure level during a rotational-speed alignment phase of the transmission input rotational speed from the level of the synchronous rotational speed of the actual ratio toward the level of the synchronous rotational speed of the demanded target ratio, the level of the torque transfer capacity of the clutch for engagement can, during the rotational-speed alignment phase, be adjusted in a harmoniously regulated fashion from the synchronous rotational speed of the actual ratio toward the synchronous rotational speed of the transmission input shaft of the target ratio for engagement. No corresponding engine torque intervention is required for this purpose, whereby the entire dynamic torque of the drive machine is available for utilization for a desired level of performance to be set.

In a further variant of the method according to the invention, a ratio change demanded as a performance shift is prevented, and is executed as a comfort-emphasized shift, if at least one operating parameter of the dual-clutch transmission lies within or outside a range.

As exclusion criteria, it is for example possible to check operating parameters which prevent or pose a risk to a disturbance-free sequence of the performance shift or in the presence of which comfort demands must obligatorily be met before the implementation of corresponding performance.

Here, it is possible in each case, before the execution of a timing-sensitive function or of a performance shift, to check whether an operating temperature of the hydraulic fluid is too high or too low, the drive rotational speed of a drive machine of a vehicle power train equipped with the dual-clutch transmission lies outside a defined rotational speed window, and whether a present volumetric flow of the hydraulic pump is too high or too low. Furthermore, it is also possible to monitor the system pressure presently prevailing in the primary pressure circuit and a clutch fill level and to prevent a demanded ratio change in the form of a performance shift particularly in the presence of an excessively low system pressure by which the performance demands made cannot be met as desired.

It may additionally be provided that a ratio change demanded as a performance shift is not executed if the torque of the target ratio to be set by the demanded performance shift is higher than a maximum achievable value or lower than a minimum value, wherein the ratio change is then executed in the form of a comfort-emphasized shift.

If a vehicle equipped with the vehicle power train is equipped for example with a comfort mode and if the latter is activated, a possibly demanded performance shift may likewise be suppressed and executed as a comfort-emphasized shift.

If the hydraulic system is in an insufficiently adapted operating state or if the hydraulic system is in an emergency or substitute program or if a defective sensor system is present, this likewise has the effect in a variant of the method according to the invention that a demanded performance shift is not executed and the demanded ratio change is executed as a comfort-emphasized shift.

In a further variant of the method according to the invention, a ratio change demanded as a performance shift is executed as a comfort-emphasized shift if an additional time period from the time point at which the target actuating pressure of the clutch for engagement is adjusted toward the fast-charging pressure level to a time point at which the actual actuating pressure exceeds a defined pressure threshold is longer than an adapted dead time of a hydraulic system of the dual-clutch transmission.

The information required for implementing this variant regarding the additional time period is determinable and stored in each case during a shift performed before the presently demanded ratio change. Thus, it is ensured with little effort that performance shifts are executed as desired within short operating times as performance shifts in the presence of an additional time period which was determined during a previously performed shift and which is shorter than or equal to an adapted dead time. However, if during a shift an additional time period is determined which is longer than the adapted dead time, a ratio change which follows the preceding shift and which is demanded as a performance shift is not executed with the desired high performance and is executed as a comfort-emphasized shift.

In a variant of the method according to the invention, a ratio change demanded as a performance shift is executed as demanded only after a minimum number of shifts or charging processes of the clutches which result in a deaerated state of the actuating paths of the clutches, the demanded ratio change otherwise being implemented as a comfort-emphasized shift.

Both the features specified in the patent claims and the features specified in the following exemplary embodiments of the subject matter according to the invention are suitable in each case individually or in any desired combination with one another for refining the subject matter according to the invention.

Further advantages and advantageous embodiments of the subject matter according to the invention will emerge from the patent claims and from the exemplary embodiments described in principle below with reference to the drawings, wherein for the sake of clarity, the same reference designations are used for structurally and functionally identical components in the description of the various exemplary embodiments.

BRIEF DESCRIPTION OF THE DRAWINGS

The invention is described more specifically by example on the basis of the attached figures. The foiling is shown:

FIG. 1 is set by means of a target specification of the actuating pressure of the clutch for engagement.

DETAILED DESCRIPTION

Figure 1:
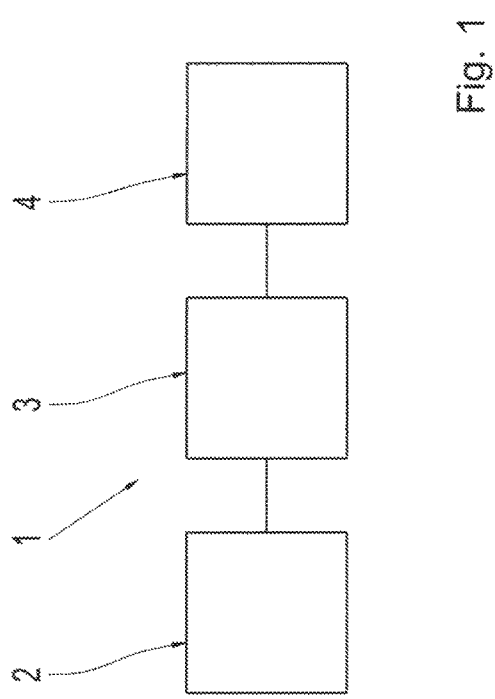
FIG. 1 shows a schematic illustration of a vehicle power train with a drive machine, an output and a transmission arranged in the power flow of the vehicle power train between the drive machine and the output.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic illustration of a vehicle power train having a drive machine 2, a transmission 3 is a dual-clutch transmission, and an output 4, wherein the input side of the transmission 3 is operatively connected to the drive machine 2 and at the output side of the transmission to the output 4. The transmission 3 is equipped with an electrohydraulic transmission control system which includes a pressure medium source, which in this case is configured as an adjustable hydraulic pump. The adjustable hydraulic pump is, in this case, a regulable vane-type pump by which a variable volumetric flow is providable. The volumetric flow of the hydraulic pump is adjustable by a valve device. Alternatively, the hydraulic pump may also be a fixed displacement pump.

Aside from the valve device, the electrohydraulic transmission control system or the hydraulic system also includes a system pressure valve, by which a system pressure is introducible into a pressure circuit as a primary pressure circuit of the electrohydraulic transmission control system, which pressure circuit is supplied with hydraulic fluid provided by the hydraulic pump via the system pressure valve with higher priority than a secondary pressure circuit likewise arranged downstream of the system pressure valve.

Various consumers of the transmission 3 are supplied with hydraulic fluid both via the primary pressure circuit and via the secondary pressure circuit, wherein inter alia shift elements or clutches of a dual-clutch system of the transmission 3 are charged with actuating pressure via the primary pressure circuit, whereas a cooling and lubricating oil system of the transmission 3 is provided with a supply via the secondary pressure circuit of the electrohydraulic transmission control system.

Figure 2:
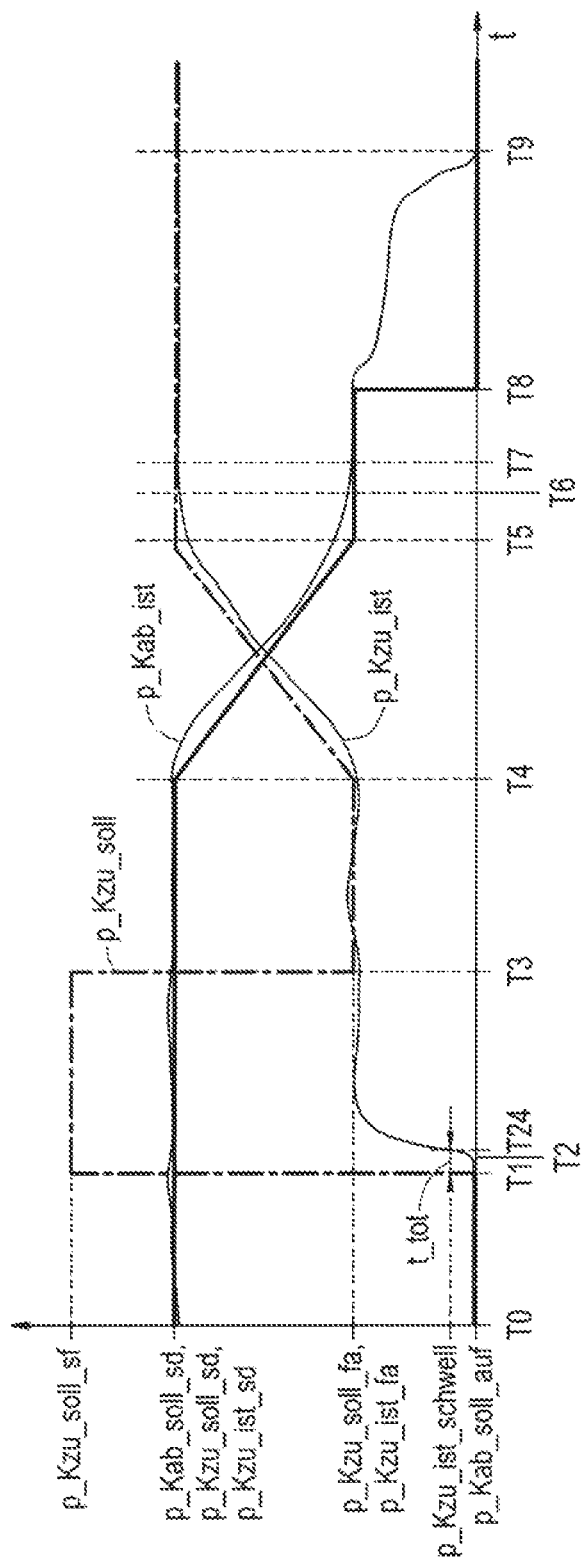
FIG. 2 shows profiles of actuating pressures of clutches during a comfort-emphasized ratio change in the transmission shown in FIG. 1 as a dual-clutch transmission.

FIG. 2 shows profiles of target actuating pressures p_Kab_soll, p_Kzu_soll and of actual actuating pressures p_Kab_ist and p_Kzu_ist of a clutch for disengagement during a demanded ratio change, and of a clutch for engagement during the demanded ratio change in the transmission 3, of a dual-clutch system of the transmission 3 over the time t.

At a time point T0, an actual ratio is engaged in the transmission 3, the actual ratio is in a manner known per se engaged by one of the two transmission parts of the transmission 3 by at least one shift element, wherein the power flow in the vehicle power train 1 between a transmission input shaft and a transmission output shaft of the transmission 3 is led through the clutch which is engaged in the power flow at the time point T0 by corresponding application of the actual actuating pressure p_Kab_ist. At the time point T1, a demand for a ratio change is triggered which is to be implemented by the disengagement described in more detail below of the clutch for disengagement and by corresponding closure or engagement of the clutch for engagement of the dual-clutch system. As a result of the disengagement of the clutch for disengagement and the engagement of the clutch for engagement, the torque to be conducted via the transmission 3 is, after the ratio change, transmitted as correspondingly demanded via the ratio engaged by the second transmission part of the transmission 3.

For this purpose, the target actuating pressure p_Kzu_soll of the clutch for engagement of the dual-clutch system is at the time point T1 increased to the fast-charging pressure level p_Kzu_soll_sf, whereas the target actuating pressure p_Kab_soll of the clutch for disengagement is from the time point T1 for the time being left constant at the closing pressure level p_Kab_soll_sd.

Since the electrohydraulic transmission control system or the hydraulic system of the transmission 3 reacts with a delay to the increase of the target actuating pressure p_Kzu_soll to the fast-charging pressure level p_Kzu_soll_sf owing to a response behavior inherent in the system, it is only at a time point T2 which follows the time point T1 that the profile of the actual actuating pressure p_Kzu_ist increases in the manner illustrated in FIG. 2 to a pressure level p_Kzu_ist_fa of a charging compensation phase which follows the fast-charging phase of the clutch for engagement at the time point T3. At the end of the fast-charging phase of the clutch for engagement, the target actuating pressure p_Kzu_soll of the clutch for engagement is reduced to the pressure level p_Kzu_soll_fa and is kept substantially constant at said pressure level over the charging compensation phase which lasts until the time point T4.

At the time point T4, the clutch for engagement is in an operating state in which the torque transfer capacity thereof is equal to zero as before and an increase of the actual actuating pressure p_Kzu_ist of the clutch for engagement results in an immediate increase in the torque transfer capacity. From the time point T4, the target actuating pressure p_Kzu_soll of the clutch for engagement is increased in ramped fashion toward the closing pressure level p_Kzu_soll_sd, wherein the profile of the actual actuating pressure p_Kzu_ist of the clutch for engagement follows the profile of the target actuating pressure p_Kzu_soll with a defined delay as illustrated. At the time point T5, the target actuating pressure p_Kzu_soll of the clutch for engagement reaches the closing pressure level p_Kzu_soll_sd and is subsequently left at said pressure level. At a further time point T6 which follows the time point T5, the actual actuating pressure p_Kzu_ist of the clutch for engagement likewise reaches the individually predefinable closing pressure level p_Kzu_ist_sd.

To be able to execute the ratio change in the transmission 3 with a desired high level of driving comfort, the target actuating pressure p_Kab_soll of the clutch for disengagement is at the time point T4 reduced in ramped fashion as illustrated to a pressure level p_Kab_soll1, at which the torque transfer capacity of the clutch for disengagement is substantially equal to zero. The target actuating pressure reaches said pressure level at the time point T5. From the time point T5, the target actuating pressure p_Kab_soll is left at the pressure level p_Kab_soll1. The profile of the actual actuating pressure p_Kab_ist of the clutch for disengagement in turn follows the target specification with a corresponding delay and reaches the pressure value p_Kab_soll1 shortly after the time point T6 at a time point T7.

At a time point T8 which follows the time point T7, the target actuating pressure p_Kab_soll of the clutch for disengagement is abruptly reduced to the opening pressure level p_Kab_soll_auf and is subsequently left constant at said pressure level, whereby the profile of the actual actuating pressure p_Kab_ist of the clutch for disengagement likewise falls as illustrated toward the opening pressure level p_Kab_soll_auf over the time t, and the clutch for disengagement is discharged. At a time point T9, the clutch for disengagement has been substantially completely discharged and the demanded ratio change has been fully completed.

The delayed response behavior of the clutch for engagement as illustrated in FIG. 2 is characterized by a reproducible dead time t_tot specific to each individual example between the time point T2 and a time point T24 at which the actual actuating pressure p_Kzu_ist of the clutch for engagement exceeds a pressure threshold p_Kzu_ist_schwell. The response behavior of the hydraulic system of the transmission 3, and thus also the dead time t_tot, vary over the operating range of the transmission 3 in a manner dependent on the operating temperature, on a hydraulic fluid volume flow provided by the hydraulic pump, on a drive rotational speed of the drive machine 2, and on further operating parameters of the vehicle power train 1. Furthermore, the dead time t_tot of the hydraulic system varies in a manner dependent on manufacturing tolerances in the hydraulic actuating path of the clutches of the dual-clutch system and in a manner dependent on variances in electrohydraulic pressure actuators assigned to the clutches.

This has the result that the dead time t_tot also varies to a not inconsiderable extent from transmission to transmission in a transmission series owing to allowed manufacturing tolerance ranges of the components installed in the transmission 3, which if a dead time determined applicatively for all transmissions is taken as a basis for shifting operations can give rise to considerable driving comfort losses in particular in the case of operating state changes of the transmission 3 to be performed within short operating times, and is thus undesired. Such a timing-sensitive function is a performance shift which may be demanded for example by a driver or by a driving strategy correspondingly stored in the vehicle and which, owing to a sporty demand, is to be executed much more quickly or within shorter operating times in relation to the more comfort-oriented shift illustrated in FIG. 2.

Figure 3:
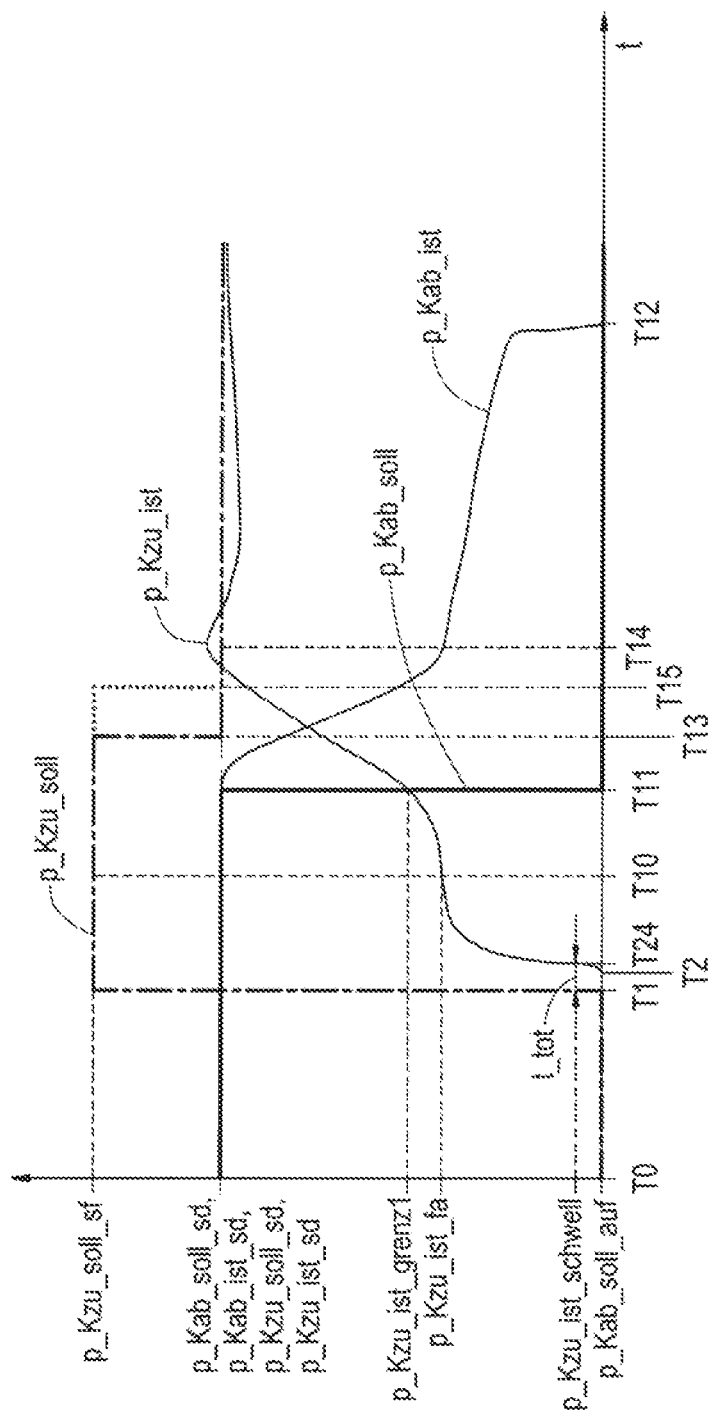
FIG. 3 shows an illustration corresponding to FIG. 2 of the profiles of the actuating pressures that take effect over the time t during a so-called performance shift in the transmission as per FIG. 1.

FIG. 3 shows the profiles of the target actuating pressures p_Kab_soll and p_Kzu_soll and the profiles of the actual actuating pressures p_Kab_ist and p_Kzu_ist of the clutch for disengagement and of the clutch for engagement during such a performance shift in the transmission 3.

At the time point T0, an actual ratio is engaged in the transmission 3. At the time point T1, a demand for a ratio change toward a target ratio is in turn triggered, wherein as described above with regard to FIG. 2 firstly the target actuating pressure p_Kzu_soll of the clutch for engagement is abruptly increased from the opening pressure level p_Kzu_soll to the pressure level p_Kzu_soll_sf or, more specifically, to the fast-charging pressure level. From the time point T1, the target actuating pressure p_Kzu_soll is left at the pressure level of the fast-charging phase.

By contrast to the shift process as per FIG. 2, during the ratio change as per FIG. 3 the target actuating pressure p_Kzu_soll is also left constant at the fast-charging pressure level p_Kzu_soll_sf after a time point T10 at which the actual actuating pressure p_Kzu_ist of the clutch for engagement exceeds the charging compensation pressure level p_Kzu_ist_fa. At a time point T11, the actual actuating pressure p_Kzu_ist of the clutch for engagement exceeds a defined pressure threshold p_Kzu_ist_grenz1, as a result of which the target actuating pressure p_Kab_soll of the clutch for disengagement is at the time point T11 abruptly reduced to the opening pressure level p_Kab_soll_auf and subsequently left at said pressure level. This has the effect that the actual actuating pressure p_Kab_ist of the clutch for disengagement decreases as illustrated with a relatively steep gradient first and subsequently with a relatively shallow gradient toward the opening pressure level p_Kab_ist_auf, which the actual actuating pressure p_Kab_ist of the clutch for disengagement in this case reaches at the time point T12.

System parameters such as, for example, a characteristic curve deviation of electrohydraulic pressure actuators and torque transfer capacities and stiffness transitions of the clutch for engagement and of the clutch for disengagement are determined adaptively. Furthermore, the response behavior of the clutch actuating paths are taken into consideration by correspondingly adaptive algorithms in the electronic transmission controller. By the adapted system parameters, it is made possible to calculate a suitably exact adaptation, which is provided for relatively short operating times t, of the fast-charging phase and to perform targeted overcharging of the piston chamber of the clutch for engagement during a performance shift in order to increase the actual actuating pressure p_Kzu_ist of the clutch for engagement directly to virtually any target pressure level with maximum system performance, which is limited by the hydraulic delay time. For this reason, the target actuating pressure p_Kzu_soll of the clutch for engagement is in this case reduced from the fast-charging pressure level p_Kzu_soll_sf to the closing pressure level p_Kzu_soll_sd for the first time at a time point T13 which follows the time point T11, whereas the clutch for disengagement is abruptly opened ahead of time at the correct moment, in this case at the time point T11.

Since, during the above-described execution of a performance shift, the blending phase between the two clutches of the dual-clutch system which ends at a time point T14 is no longer based on targeted closed loop and open loop control as in the case of the shift forming the basis of the illustration in FIG. 2 but is defined only by the hydraulic delay time or the dead time t_tot, the actuation timing of the two clutches of the dual-clutch system must be exactly set in order to be able to set the correct torque balance during the blending phase as required. If this is not achieved, the level of driving comfort during a performance shift may be impaired to an extent unacceptable to a driver, which is however undesired.

In a manner dependent on the respectively present operating state profile of the vehicle power train 1, the target actuating pressure p_Kzu_soll of the clutch for engagement is, for example, reduced from the fast-charging pressure p_Kzu_soll_sf to the closing pressure level p_Kzu_soll_sd during the performance shift to be executed only proceeding from a time point T15, in order to be able to execute the performance shift as desired with high performance or driving power within desired short operating times with at the same time the highest possible level of driving comfort.

Aside from the operating parameters specified here, the response behavior of the hydraulic system or of the electrohydraulic transmission control system of the transmission 3 is also undesirably impaired by air inclusions in the hydraulic actuating path of the clutches, which makes the actuation of the transmission 3 during the execution of a performance shift additionally difficult.

To be able to realize performance shifts and further time-sensitive functions over a wide operating range of the vehicle power train 1 with acceptable driving comfort throughout, for example, even in a lower sport-oriented range with shifts demanded merely by a driver using a manual shifting gate, it is necessary to determine the reproducible dead time t_tot specific to each individual example. In a manner dependent on the reproducible dead time t_tot specific to each individual example, it is necessary in each case before the execution of a performance shift to determine whether the performance shift is executable as desired, because performance shifts cannot readily be ended after having been started. This results from the fact that a termination of a performance shift leads to a considerable impairment in driving comfort and in the driving behavior of the vehicle, which is not accepted by a driver.

Aside from the aspect of the smooth transition of sporty and at the same time comfortable operation, it is also sought to achieve that, by shifts which are performed adequately quickly, hybrid applications with electric machines do not have to unduly interrupt the recuperation process during stoppage processes.

To improve the robust and reproducible driving impression that can be realized, operating states which are acutely unfavorable for reproducibility and phases which can adversely affect the behavior subsequently are already determined in advance, and the execution of a performance shift is impeded in order to ensure comfort. Modifications of the actuation during a performance shift for the purposes of achieving this aim are described below. Before the execution of a performance shift, the following exclusion criteria are checked in advance in order to be able to ensure the regulated sequence of a performance shift.

Air inclusions in the hydraulic actuating path of the clutches are highly unfavorable for the execution of time-sensitive functions such as the performance shift, because the existence of air inclusions and the effects thereof on the system behavior, particularly on the response behavior of the hydraulic system, are not determinable and directly tangible in advance. To be able to suitably counter this situation, operating states or operating state profiles during which air can typically collect or has been collected in the actuating duct or actuating path of the clutches of the dual-clutch system are determined first. This is the case, for example, after a vehicle restart after a relatively long standstill period or during so-called engine start-stop phases.

Furthermore, relatively long interruptions in charging of the clutches and relatively long driving periods promote air accumulations, wherein such driving periods are characterized by a high pump delivery or cooling oil volume flow. Since it is generally known that, during charging processes or hydraulic actuations of the clutches of the dual-clutch system of the transmission 3, air accumulations are purged out of the actuating ducts thereof, a minimum number of shifts or charging processes of the clutches which must be executed in order to be able to assume a deaerated state of the actuating paths of the clutches before timing-sensitive functions or performance shifts are performed is defined as exclusion criterion. For example, if the hydraulic pump has drawn in air along with the hydraulic fluid, or if the charging processes required for an adequately deaerated operating state of the hydraulic system have not been reached, then preceding charging processes are additionally continuously evaluated as regards whether a deaerated system can be inferred therefrom.

The significant influence of air inclusions on the dead time t_tot of the hydraulic system of the transmission 3 is determinable by measurement for example using pressure sensors provided in the dual-clutch system or in the clutches. For this purpose, a dead time adaptation and monitoring based thereon are performed, which provide corresponding information which is utilized. On the basis of the information provided by the dead time adaptation regarding the reproducible dead time specific to each individual part example, it is verifiable with the aid of the monitoring whether the value determined for the dead time exceeds a significance threshold, on the basis of which it can in turn be identified whether the hydraulic system has been sufficiently deaerated or if too much air is situated in the hydraulic system. In the case of the latter monitoring result, the performance shift is blocked until a value admissible for the execution of the performance shift function is determined.

For the adaptation of an applicatively determined dead time of the hydraulic system assigned to the clutches in a deaerated operating state of the hydraulic system, in each case one target actuating pressure of one of the clutches is generated, and time monitoring is performed starting at the time point from which the target actuating pressure is demanded. By the time monitoring, the time period that elapses until the actual actuating pressure is identified as being higher than a threshold is determined, wherein the applicative dead time is adapted in a manner dependent on the determined time period. Subsequently, the adapted value of the dead time is stored in a non-transient memory and is thus available as desired for the monitoring.

In order to be able to execute the dead time adaptation in each case proceeding from a defined operating state of the hydraulic system and thus in a uniquely verifiable and reproducible manner, the target actuating pressure of the respectively checked clutch is demanded proceeding from a substantially unpressurized operating state of the clutch and is furthermore abruptly increased here to a defined pressure level of the actuating pressure. To avoid erroneous adaptations, the time period is determined several times in succession in the manner described, wherein an average value is subsequently formed on the basis of the successively determined time periods, in a manner dependent on which average value the applicative dead time is adapted.

Since the dead time varies considerably in a manner dependent on the present operating temperature of the hydraulic fluid that is used in the hydraulic system for actuating the clutches, the time period is determined for the entire temperature range of the hydraulic fluid. Furthermore, the time period is also determined for different hydraulic fluid volume flows that are directed towards the clutch in order to be able to provide, and take into consideration, the dependency on the charging speed of the clutches.

To be able to take into consideration effects which influence the dead time over the service life of the transmission 3, the dead time adaptation is repeated several times over the service life of the transmission, wherein then the adapted dead times determined during the most recent dead time adaptation form the basis for the dead time adaptation to be newly performed and are adapted by said newly performed dead time adaptation, by which the most recently adapted dead times are used instead of the applicative dead time.

If the monitoring now determines in each case a response behavior of the hydraulic system which deviates from the adapted response behavior or from the adapted dead time by more than a threshold, a hydraulic system not sufficiently deaerated for the execution of the performance shift is, for example, identified by the monitoring function, and the performance shift is not permitted.

As further exclusion criteria, operating parameters are checked which prevent or pose a risk to a disturbance-free sequence of the performance shift or in the presence of which comfort demands must imperatively be met before the implementation of corresponding performance.

Here, it is checked in each case whether an operating temperature of the hydraulic fluid is too high or too low, the drive rotational speed of the drive machine 2 lies outside a defined rotational speed window and whether a present volumetric flow of the hydraulic pump is too high or too low. Furthermore, the system pressure presently prevailing in the primary pressure circuit and a clutch fill level are monitored, wherein performance demands made cannot be met as desired in particular in the presence of an excessively low system pressure. Furthermore, a performance shift is not executed if the torque of the target ratio to be set by demanded performance shift is higher than a maximum achievable value or lower than a minimum value. If a vehicle equipped with the vehicle power train 1 is equipped for example with a comfort mode and if the latter is activated, a possibly demanded performance shift is likewise suppressed. If the hydraulic system is in an insufficiently adapted operating state or if the hydraulic system is in an emergency or substitute program or if a faulty sensor arrangement is present, this likewise has the effect that a demanded performance shift is not executed.

If the exclusion criteria, which are not considered exhaustively here, for the execution of a performance shift are not met, the execution of a performance shift is permitted, wherein the shift sequences forming the basis for FIG. 4 to FIG. 7 each have modifications in relation to the shift sequence forming the basis for FIG. 3 for the purposes of permitting an improvement in robustness of performance shifts. Owing to the high shift speed of performance shifts and the short operating time window, it is additionally also achieved that other disturbances or changes in the system environment that can arise during a performance shift that is actively taking place, for example a load reversal, are so unlikely, or the effects thereof on the shift sequence are so slight, that they are no longer of significance with regard to effect on driver impression.

Since, despite all preventative measures taken, it is possible during an active performance shift that the timing does not take effect in such a way as to realize perfect performance, and effects that are unacceptable to a driver can arise during such adverse operating state profiles, the actual actuating pressure of the clutch for engagement is monitored during the performance shifts respectively forming the basis for the illustrations as per FIG. 4 to FIG. 7, and in a manner dependent on the monitoring the timing is, if necessary, adapted such that the performance shift is performable in each case with acceptable driving comfort or shift comfort.

Figure 4:
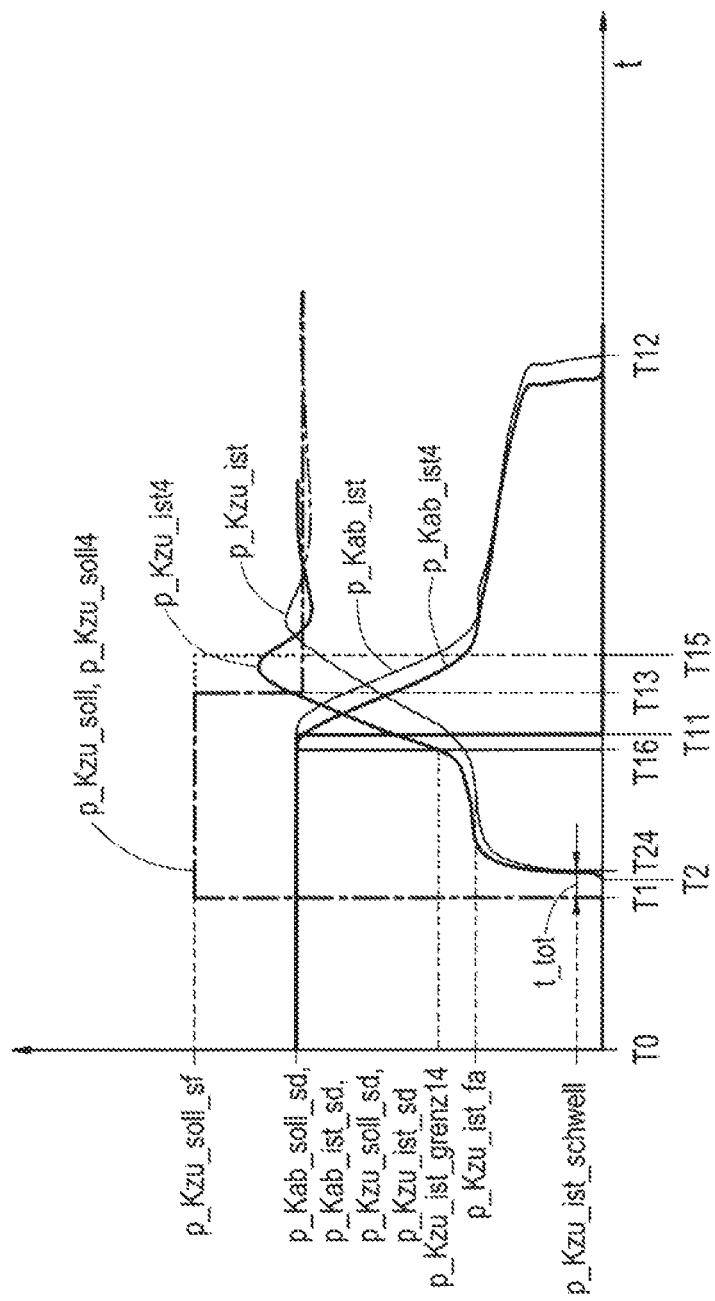
FIG. 4 shows an illustration corresponding to FIG. 3 of the profiles of the actuating pressures of the clutches during a performance shift, wherein the clutch for engagement reaches a defined torque transfer capacity already before an expected time point and the clutch for disengagement is transferred into the open operating state ahead of time.

In FIG. 4, alongside the profiles of the target actuating pressures $p\_Kab\_soll$ and $p\_Kzu\_soll$ and of the actual actuating pressures $p\_Kab\_ist$ and $p\_Kzu\_ist$ illustrated in FIG. 3, further profiles $p\_Kab\_soll4$ and $p\_Kzu\_soll4$ and also $p\_Kab\_ist4$ and $p\_Kzu\_ist4$ are illustrated which deviate from the profiles $p\_Kab\_soll$, $p\_Kzu\_soll$ and $p\_Kab\_ist$, $p\_Kzu\_ist$ owing to the measures described in more detail below.

If the performance shift is started as desired at the time point T1 and if it is already the case during the charging process of the clutch for engagement, that is to say during the fast-charging phase, that a pressure value $p\_Kzu\_ist\_grenz14$ of the actual actuating pressure $p\_Kzu\_ist$ is determined which is higher than the pressure value $p\_Kzu\_ist\_grenz1$ before a time at which this would be expected from the set timing, measures which adapt the profile of the actual actuating pressure $p\_Kzu\_ist$ of the clutch for engagement as desired are no longer possible, as a result of which the target actuating pressure $p\_Kab\_soll$ of the clutch for disengagement is reduced abruptly from the closing pressure level $p\_Kab\_soll\_sd$ to the opening pressure level $p\_Kab\_soll\_auf$ already before the time point T11, that is to say in this case at the time point T16, which has the effect that the blending phase is commenced already at the time point T16 as a result of early opening of the clutch for disengagement.

Figure 5:
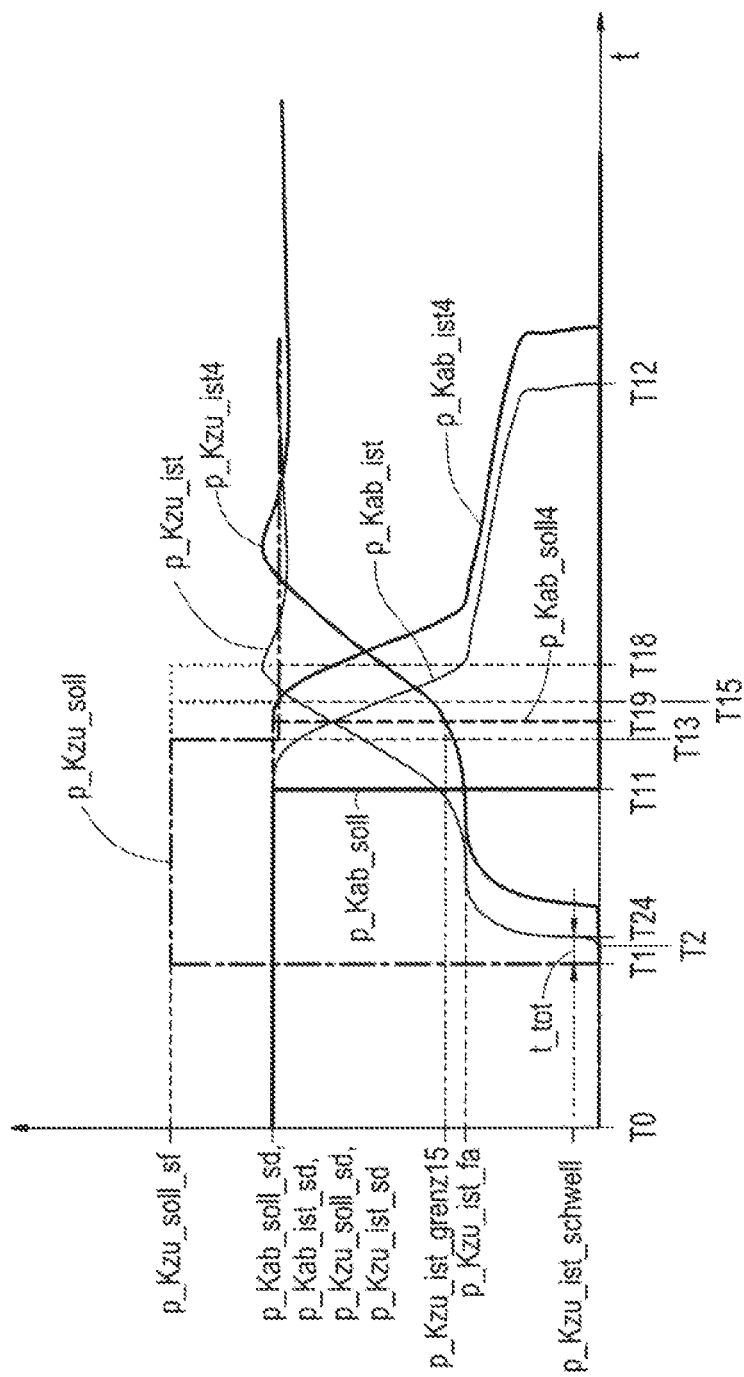
FIG. 5 shows an illustration corresponding to FIG. 3 of the profiles of the actuating pressures over the time t, wherein the clutch for engagement reaches a defined torque transfer capacity only after a predefined time point, as a result of which the opening of the clutch for disengagement is prevented beyond the predetermined time point and said clutch is transferred into its open operating state only when the defined torque transfer capacity is reached.

By contrast to this, if it is the case during the charging process of the clutch for engagement that a pressure value $p\_Kzu\_ist\_grenz15$ is not exceeded at the time point T11 but is reached only at a later time point T19, the target actuating pressure $p\_Kzu\_soll$ of the clutch for engagement is, by contrast to the shift sequence forming the basis for FIG. 3, reduced from the fast-charging pressure level $p\_Kzu\_soll\_sf$ to the closing pressure level $p\_Kzu\_soll\_sd$ only after the time point T15, that is to say in this case, in the shift sequence forming the basis for the profiles in FIG. 5, only at a time point T18. Here, the pressure value $p\_Kzu\_ist\_grenz15$ is lower than the pressure value $p\_Kzu\_ist\_grenz1$. Furthermore, in the operating state profile of the vehicle power train 1 considered by way of example in FIG. 5, the target actuating pressure $p\_Kab\_soll$ of the clutch for disengagement is reduced abruptly from the closing pressure level $p\_Kab\_soll\_sd$ to the opening pressure level $p\_Kab\_soll\_auf$ only at a time point T19 which lies between the time points T13 and T15. By the lengthening of the fast-charging pulse of the clutch for engagement and the delayed opening of the clutch for disengagement, a situation in which the clutch for disengagement is transferred into its open operating state too early is avoided with little effort and the start of the blending phase of the two clutches is delayed until the clutch for engagement is substantially prepared for taking on load from the clutch for disengagement.

Thus, the threshold value $p\_Kzu\_ist\_grenz14$ of the actual actuating pressure $p\_Kzu\_ist$ of the clutch for engagement, which triggers the early opening of the clutch for disengagement as described in more detail with regard to FIG. 4, lies above the threshold value $p\_Kzu\_ist\_grenz15$ of the actual actuating pressure $p\_Kzu\_ist$ of the clutch for engagement, up to which the target actuating pressure $p\_Kab\_soll$ of the clutch for disengagement is kept at the closing pressure level $p\_Kab\_soll\_sd$, in order to delay the opening of the clutch for disengagement in relation to the shift sequence of a performance shift forming the basis for FIG. 3.

In order that the shift sequence of the performance shift is not unduly influenced by the characteristics of the vehicle power train 1, for the level of the torque transfer capacity to be set in the clutch for engagement or for the torque level of said clutch, a value is selected in each case taking the transmission ratio step of the shift into consideration, by which selected value the acceleration level during the blending phase of the two clutches can be kept at the level of the actual ratio engaged in the transmission 3 at the time point T0. It is achieved in this way that the vehicle power train 1 is loaded virtually uniformly during the blending phase of the performance shift and disturbances or undesired fluctuations in the profile of the torque acting in the output 4 are avoided in a simple manner. The subsequent level of the torque transfer capacity is, during the rotational-speed alignment phase, adjustable in a harmoniously regulated fashion from the synchronous rotational speed of the actual ratio toward the synchronous rotational speed of the transmission input shaft of the target ratio for engagement. No corresponding engine torque intervention is required for this purpose, whereby the entire dynamic torque of the drive machine is available for utilization for a desired level of performance.

Figure 6:
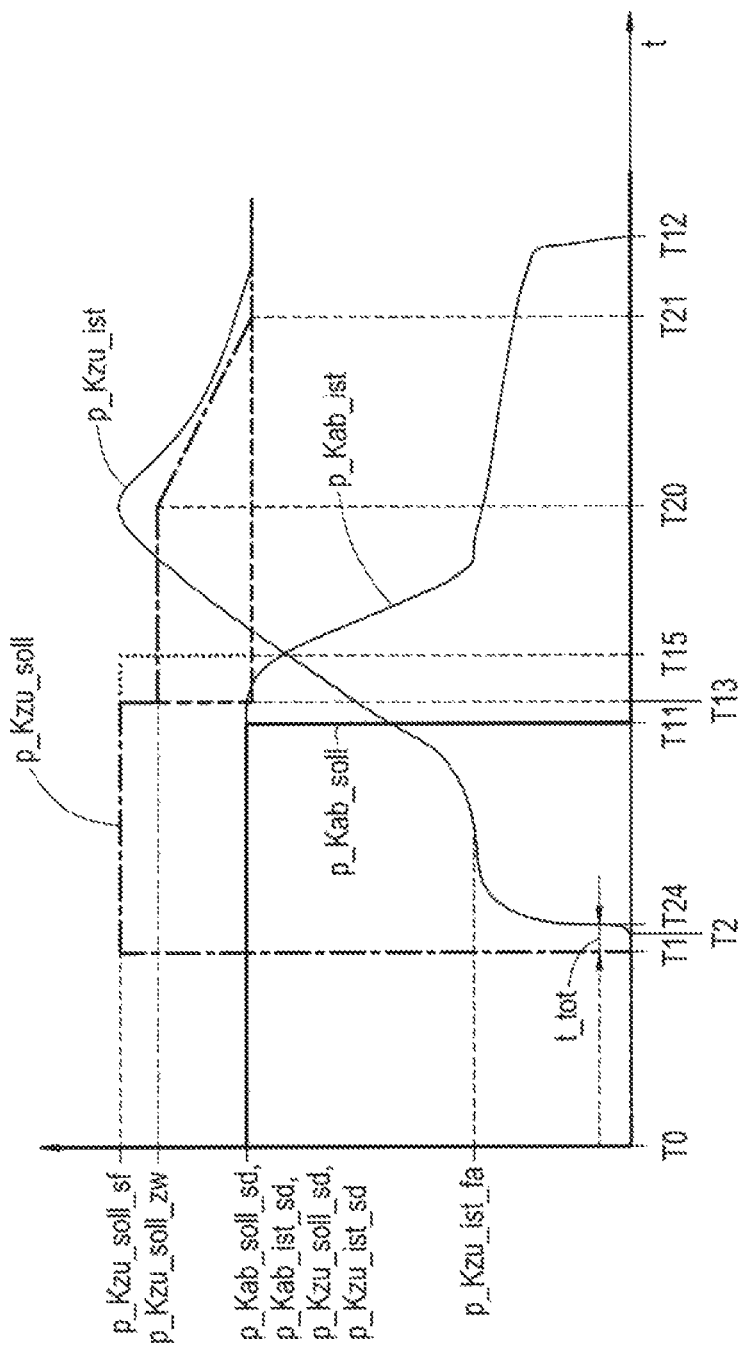
FIG. 6 shows an illustration corresponding to FIG. 3 of the profiles of the actuating pressures over the time t, wherein a constant profile of the torque acting at the output of the vehicle power train as per
Figure 7:
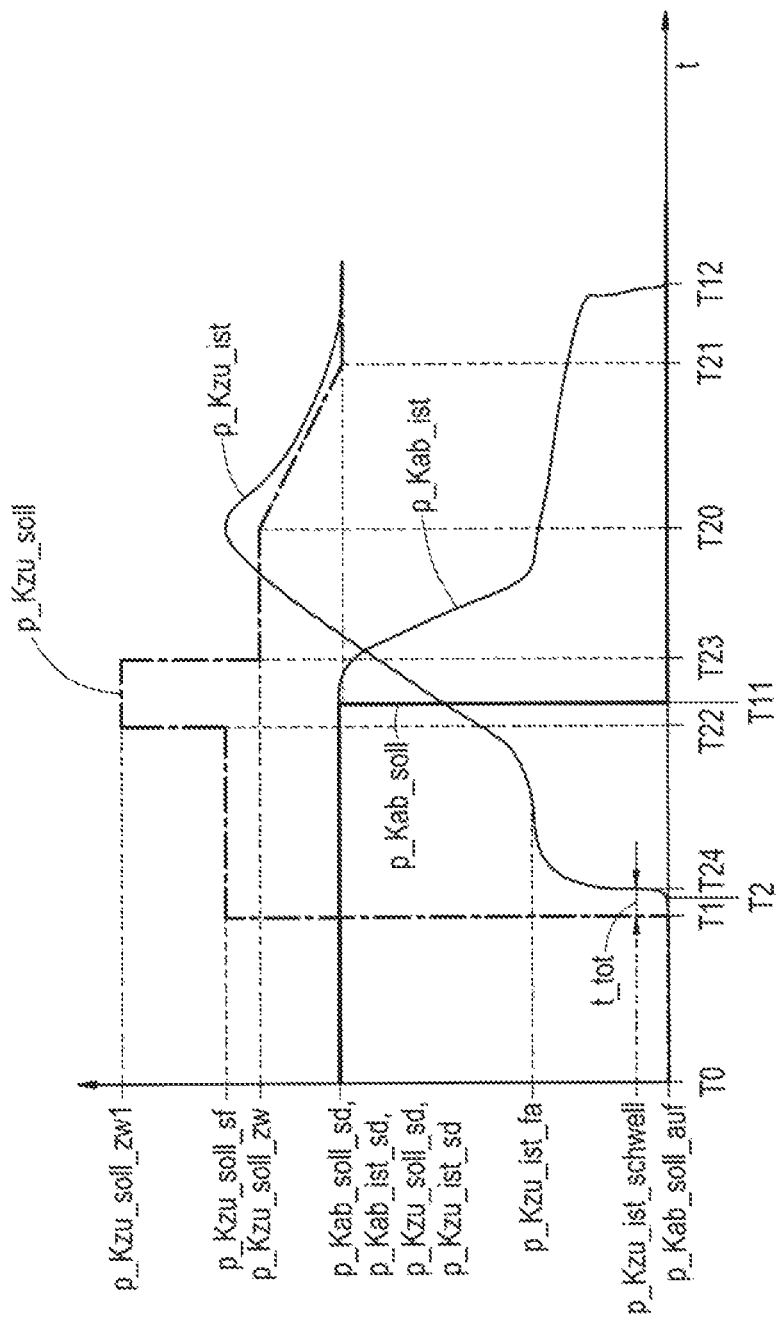
FIG. 7 shows an illustration corresponding to FIG. 6 of the profiles of the actuating pressures of the clutches, wherein an excessive increase of the activation during the phase when the actual actuating pressure of the clutch for engagement is provided in order to prevent a delayed build-up of the torque acting at the output during the actuation of the clutch for engagement.

Specifically, this is achieved as illustrated in FIG. 6 in that the target actuating pressure p_Kzu_soll of the clutch for engagement is at the time point T13 initially reduced from the fast-charging pressure level p_Kzu_soll_sf only to an intermediate pressure level p_Kzu_soll_zw which is higher than the closing pressure level p_Kzu_soll_sd, and is left at said pressure level up to a time point T20. Proceeding from the time point T20, the target actuating pressure p_Kzu_soll is reduced for example in ramped fashion to the closing pressure level p_Kzu_soll_sd until a time point T21. Here, the intermediate pressure level p_Kzu_soll_zw corresponds to a acceleration-neutral pressure level by which the acceleration level of the vehicle equipped with the vehicle power train 1 is, during the blending phase, substantially maintained at the level of the actual ratio engaged in the transmission 3 at the time point T0.

During certain operating state profiles of the vehicle power train 1, the target actuating pressures p_Kzu_soll of the clutch for engagement, which have to be set in order to realize an as far as possible acceleration-neutral overlap phase, lie in part above the fast-charging pressure level p_Kzu_soll_sf in order to attain the target torque level. Then, the fast-charging phase alone does not ensure that, during the increase of the actual actuating pressure p_Kzu_ist of the clutch for engagement, the volume-flow-generating pressure delta between the target actuating pressure p_Kzu_soll and the actual actuating pressure p_Kzu_ist is sufficient to maintain the desired gradient of the profile of the actual actuating pressure p_Kzu_ist until the acceleration-neutral level is attained. Without additional measures, the gradient of the profile of the actual actuating pressure p_Kzu_ist of the clutch for engagement levels-off in an undesired manner, and the build-up of the torque transfer capacity of the clutch for engagement is delayed if the acceleration-neutral level is attained too late.

For this reason, in this case, at a time point T22 that precedes the time point T11, the target actuating pressure p_Kzu_soll of the clutch for engagement is increased from the fast-charging pressure level p_Kzu_soll_sf to a further pressure level p_Kzu_soll_zw1 and is kept constant at said value until a further time point T23, at which the target actuating pressure p_Kzu_soll is reduced from the further pressure level p_Kzu_soll_zw1 to the intermediate pressure level p_Kzu_soll_zw, at which the target actuating pressure p_Kzu_soll is in turn left until the time point T20, before said target actuating pressure is adjusted by the pressure ramp as described with regard to FIG. 6 to the closing pressure level p_Kzu_soll_sd until the time point T21. Here, the pressure pulse additionally provided between the time points T22 and T23 constitutes a desired excessive increase of the actuation of the clutch for engagement beyond a minimum pressure delta in relation to the target actuating pressure p_Kzu_soll of the clutch for engagement, by which an acceleration-neutral level can be set during the rising phase of the actual actuating pressure p_Kzu_ist of the clutch for engagement and after attainment of the charging compensation pressure level p_Kzu_ist_fa of the clutch for engagement and/or after attainment of the clutch engagement point.

By this approach, it is achieved that, during the fast-charging phase that is initially performed in the standard manner until the time point T22, the actual actuating pressure p_Kzu_ist of the clutch for engagement is adjusted to the charging pressure level p_Kzu_ist_fa, and it is subsequently ensured by the further minimum-delta-P function that the clutch for engagement continues to be charged up to the target pressure p_Kzu_soll_zw of the acceleration-neutral pressure level, or the actual actuating pressure p_Kzu_ist is adjusted to said pressure level. The maximum performance gradient is thus maintained until the target level is reached.

Modifications and variations can be made to the embodiments illustrated or described herein without departing from the scope and spirit of the invention as set forth in the appended claims.

REFERENCE DESIGNATIONS

1 Vehicle power train
2 Drive machine
3 Transmission, dual-clutch transmission
4 Output
p_Kab_ist Actual actuating pressure of the clutch for disengagement
p_Kab_ist4 Actual actuating pressure of the clutch for disengagement
p_Kab_soll Target actuating pressure of the clutch for disengagement
p_Kab_soll1 Pressure level, pressure value of the target actuating pressure of the clutch for disengagement
p_Kab_soll4 Target actuating pressure of the clutch for disengagement
p_Kab_soll_auf Opening pressure level of the target actuating pressure of the clutch for disengagement
p_Kab_soll_sd Closing pressure level of the target actuating pressure of the clutch for disengagement
p_Kzu_ist Actual actuating pressure of the clutch for engagement
p_Kzu_ist4 Actual actuating pressure of the clutch for engagement
p_Kzu_ist_fa Charging compensation pressure level of the actual actuating pressure of the clutch for engagement
p_Kzu_ist_grenz1,
p_Kzu_ist_grenz14,
p_Kzu_ist_grenz15 Threshold pressure of the actual actuating pressure of the clutch for engagement
p_Kzu_ist_sd Closing pressure level of the actual actuating pressure of the clutch for engagement
p_Kzu_soll Target actuating pressure of the clutch for engagement
p_Kzu_soll1 Pressure level of the target actuating pressure of the clutch for engagement
p_Kab_soll4 Target actuating pressure of the clutch for engagement
p_Kzu_soll_fa Charging compensation pressure level of the target actuating pressure of the clutch for engagement
p_Kzu_soll_sd Closing pressure level of the target actuating pressure of the clutch for engagement
p_Kzu_soll_sf Fast-charging pressure level of the target actuating pressure of the clutch for engagement
p_Kzu_soll_zw Intermediate pressure level of the target actuating pressure of the clutch for engagement
p_Kzu_soll_zw1 Further pressure level of the target actuating pressure of the clutch for engagement
t Time, operating time
t_tot Dead time
T0 to T24 Discrete time point

The invention claimed is:
1. A method for operating a dual-clutch transmission (3) having a dual-clutch system with two clutches, the method comprising:

establishing a ratio in the dual-clutch transmission (3) by having a first clutch of the two clutches in a closed state and a second clutch of the two clutches in an open state; and moving the first clutch to the open state and the second clutch to the closed state during a ratio change to be performed by setting a target actuating pressure (p_Kzu_soll) of the second clutch of the two clutches first to a fast-charging pressure level (p_Kzu_soll_sf) and subsequently to a closing pressure level (p_Kzu_soll_sd) and setting a target actuating pressure (p_Kab_soll) of the first clutch of the two clutches to an opening pressure level (p_Kab_soll_auf) before setting the target actuating pressure (p_Kzu_soll) of the second clutch of the two clutches to the closing pressure level (p_Kzu_soll_sd), wherein said step of setting the target actuating pressure (p_Kab_soll) of the first clutch of the two clutches comprises monitoring an actual actuating pressure (p_Kzu_ist) of the second clutch of the two clutches during the ratio change; and setting the target actuating pressure (p_Kab_soll) of the first clutch of the two clutches to the opening pressure level (p_Kab_soll_auf) in response to the actual actuating pressure (p_Kzu_ist) of the second clutch of the two clutches exceeding a pressure threshold (p_Kzu_ist_grenz1, p_Kzu_ist_grenz14, p_Kzu_ist_grenz15) during the ratio change.

2. The method according to claim 1, further comprising determining a time period using a model representing the dual-clutch system in a manner dependent on the operating state of the dual-clutch transmission before setting the target actuating pressure (p_Kzu_soll) of the second clutch of the two clutches to the fast-charging pressure level (p_Kzu_soll_sf), an expiry of the time period being when the actual actuating pressure (p_Kzu_ist) of the second clutch of the two clutches reaches the pressure threshold (p_Kzu_ist_grenz1).

3. The method according to claim 2, further comprising moving the first clutch of the two clutches to the open state before the expiry of the time period in response to the actual actuating pressure (p_Kzu_ist) of the second clutch of the two clutches reaching the pressure threshold (p_Kzu_ist_grenz14) before the expiry of the time period.

4. The method according to claim 2, further comprising moving the first clutch of the two clutches to the open state after the expiry of the determined time period in response to the actual actuating pressure (p_Kzu_ist) of the second clutch of the two clutches reaching the pressure threshold (p_Kzu_ist_grenz15) after the expiry of the determined time period.

5. The method according to claim 2, further comprising:

lengthening a further determined time period by a variable time period when the actual actuating pressure (p_Kzu_ist) of the second clutch of the two clutches reaches the pressure threshold (p_Kzu_ist_grenz15) after an expiry of the further determined time period; and adjusting the target actuating pressure (p_Kzu_soll) of the second clutch of the two clutches from the fast-charging pressure level (p_Kzu_soll_sf) toward the closing pressure level (p_Kzu_soll_sd) after the expiry of the further time period, the variable time period being variable based on the operating state of the dual-clutch transmission.

6. The method according to claim 1, wherein the fast-charging pressure level (p_Kzu_soll_sf) of the target actuating pressure (p_Kzu_soll) of the second clutch of the two clutches is at least temporarily varied such that a torque acting at the transmission output side during the ratio change corresponds at least approximately to the torque acting at the transmission output side before the ratio change.

7. The method according to claim 1, further comprising varying the target actuating pressure (p_Kzu_soll) of the second clutch of the two clutches in a regulated fashion from the fast-charging pressure level (p_Kzu_soll_sf) toward the closing pressure level (p_Kzu_soll_sd) during a rotational-speed alignment phase of the transmission input rotational speed from a synchronous rotational speed level of the current ratio toward a synchronous rotational speed level of a target ratio.

8. The method according to claim 1, further comprising preventing the ratio change as a performance shift and executing the ratio change as a comfort-emphasized shift when at least one operating parameter of the dual-clutch transmission lies within or outside a range.

9. The method according to claim 8, further comprising executing the ratio change as the comfort-emphasized shift rather than the performance shift when an additional time period from a time point (T1) to a time point (T24) is longer than an adapted dead time (t_tot) of a hydraulic system of the dual-clutch transmission (3), the time point (T1) being when the target actuating pressure (p_Kzu_soll) of the second clutch of the two clutches is adjusted toward the fast-charging pressure level (p_Kzu_soll_sf), the time point (T24) being when the actual actuating pressure (p_Kzu_ist) exceeds a defined pressure threshold (p_Kzu_ist_schwell).

10. The method according to claim 1, further comprising executing the ratio change as a performance shift only after a minimum number of shifts or charging processes of the two clutches which result in a deaerated state of the actuating paths of the two clutches, with the ratio change otherwise being implemented as a comfort-emphasized shift.

* * * * *